Patented Aug. 10, 1948

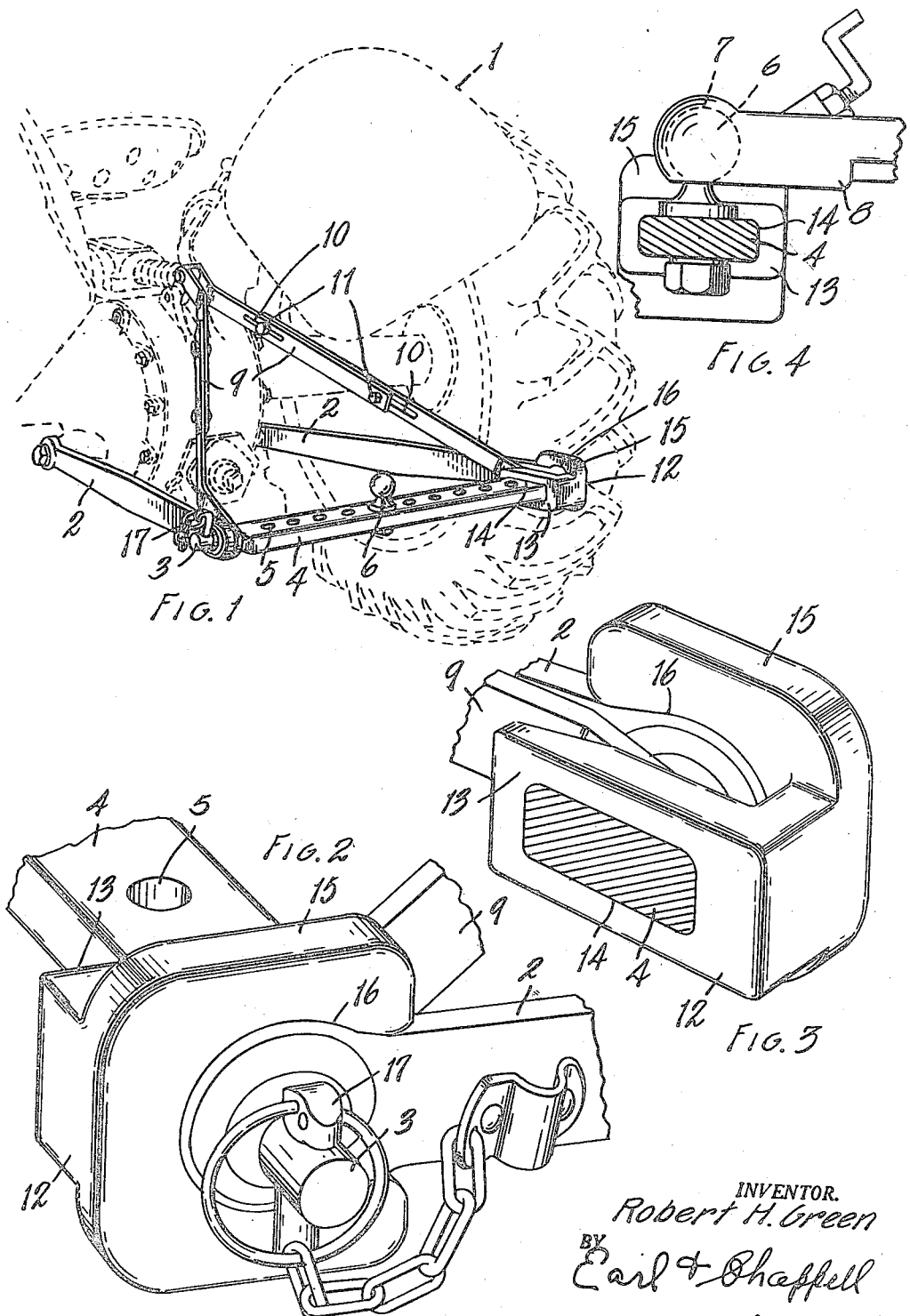

2,446,584

UNITED STATES PATENT OFFICE 2,446,584

TRACTOR HITCH

Robert H. Green, Kalamazoo, Mich.

Application August 10, 1945, Serial No. 610,064

5 Claims. (Cl. 280—33.44)

This invention relates to improvements in tractor hitch.

The main objects of this invention are:

First, to provide a tractor hitch in which the coupling bar of the hitch may be held against oscillating or rotative movement on its journals or may be permitted to oscillate or swing on its journals to better adapt the same to the particular working conditions.

Second, to provide a structure of this character which may be readily applied to or embodied in tractor hitches now in extensive use.

Third, to provide a device of this character which may be very economically produced and is easily applied to and removed from the hitch.

Further objects pertaining to details and economies of the invention will definitely appear from the description to follow. The invention is defined in the claims.

A structure which embodies the features of the invention is clearly illustrated in the accompany drawing, in which:

Fig. 1 is a perspective view of a tractor hitch embodying my invention, portions of the tractor being indicated by dotted lines to illustrate the relation of the hitch to the tractor in use.

Fig. 2 is an enlarged fragmentary perspective view of the hitch with the coupled bar locked against rotative or oscillating movement on its journal.

Fig. 3 is a fragmentary view in section on line 3—3 of Fig. 1.

Fig. 4 is a fragmentary view in section on line 4—4 of Fig. 1 illustrating the device in connection with the pole of a propelled vehicle or machine.

In the drawing portions of the tractor are illustrated by dotted lines, this being shown merely to illustrate an adaptation of the invention.

The hitch comprises a pair of laterally spaced draw bars 2 receiving the journals 3 of the coupling or hitch bar 4. This is of flat section and is provided with a longitudinal series of holes 5 adapted to receive the stem of the coupling element 6 or the bolt of a clevis or other coupling. The coupling element 6 is provided with a spherical head adapted to coact with the socket 7 of the tongue 8. This ball and socket type of coupling is illustrated as structures embodying the invention are well adapted for this type of coupling.

It is rather common experience that when the coupling bar is free to oscillate on its journal, couplings of this type may be broken or become disengaged, owing to the shifting of stresses incident to uneven ground, going up and down hills and the like. One of the objects of this invention is to provide means which prevents oscillation of the hitch bar on its journals.

The structure illustrated includes hanger links 9, preferably adjustable longitudinally, for supporting the hitch bar at the desired elevation. This adjustment is effected by slotting the link sections at 10, clamping bolts 11 being provided to secure the sections in their adjusted positions. The detachable yoke or coupling bar rock member 12 is desirably formed as a casting or forging and comprises an inner arm 13 having a hole 14 therein adapted to receive the flattened or non-circular portion of the hitch bar at the inner side of the adjacent hanger link. This yoke-like member is provided with an outer forked arm 15 having a slot-like opening 16 therein receiving the rear end of the adjacent draft bar and embracing the opposite edges thereof which are non-circular relative to the axis of the journal 3. This prevents rotative movement of the lock member and consequently the hitch bar is locked against rotative or oscillating movement on its journals. The draft bars and hanger links are retained by means of the pins 17 which permits the ready disassembling of the parts to permit positioning of the yoke or lock member in operative position, or its removal when it is desired to permit the coupling bar to oscillate on its journals. This is desirable for various agricultural implements, and they are ordinarily connected by means of a clevis.

I have illustrated and described my invention in an adaptation which I have found very satisfactory commercially. I have not attempted to illustrate adaptations to various types of hitches as it is believed this disclosure will enable those skilled in the art to embody or adapt the invention as may be desired.

Having thus described my invention what I claim as new and desire to secure by Letters Patent is:

1. In a tractor hitch, the combination with a pair of laterally spaced draw bars, of a coupling bar of flat section provided with journals at its ends engaging said draw bars and having a longitudinal series of holes adapted to selectively receive coupling elements, hanger links disposed with their lower ends on the inner sides of said draw bars to engage said journals, a coupling element selectively engageable with said holes in said coupling bar to project upwardly therefrom, and a detachable yoke having an inner arm and a slotted outer arm, said inner arm being provided with a coupling bar receiving hole extending transversely through the arm, said coupling bar projecting longitudinally of itself through said hole, said hole receiving a flattened portion of the coupling bar at the inner side of the adjacent hanger bar, said slotted outer arm receiving the end of the adjacent draw bar and engaging the edges thereof whereby pivotal movement of the coupling bar on its journals is prevented when the yoke is in position, said inner and outer arms being laterally spaced from each other to receive therebetween the lower end of the adjacent hanger link pivoted on tne coupling bar journal, said coupling bar being free to oscillate on its journals when the yoke is removed.

2. In a tractor hitch, the combination with a pair of laterally spaced draw bars, of a coupling bar of flat section provided with journals at its ends engaging said draw bars and having a longitudinal series of holes adapted to selectively receive coupling elements, longitudinally adjustable hanger links disposed with their lower ends on the inner sides of said draw bars to engage said journals, and a detachable yoke having an inner arm and a slotted outer arm, said inner arm being provided with a coupling bar receiving hole extending transversely through the arm, said coupling bar projecting longitudinally of itself through said hole, said hole receiving a flattened portion of the coupling bar at the inner side of the adjacent hanger bar, said slotted outer arm receiving the end of the adjacent draw bar and engaging the edges thereof whereby pivotal movement of the coupling bar on its journals is prevented when the yoke is in position, said inner and outer arms being laterally spaced from each other to receive therebetween the lower end of the adjacent hanger link pivoted on the coupling bar journal.

3. A tractor hitch comprising a pair of laterally spaced draw bars, a coupling bar of non-circular section adapted to receive coupling elements and provided with journals engaging said draw bars, hanger links disposed with their lower ends on the inner sides of said draw bars in engagement with its said journals, and a detachable coupling bar lock member having a coupling bar receiving opening extending transversely through the member, said coupling bar projecting longitudinally of itself through said opening, said bar lock member including an inner arm engaging the noncircular portion of said coupling bar at the inner side of the adjacent hanger bar and an outer arm slotted to engage the adjacent draw bar whereby oscillating movement of the coupling bar on its journals is prevented when the locking member is in engaged position, said inner and outer arms being laterally spaced from each other to receive therebetween the lower end of the adjacent hanger link pivoted on the coupling bar journal.

4. An integral detachable coupling lock member for a tractor hitch comprising a hanger link, a draw bar, and a coupling bar having a portion of non-circular section and adapted to receive a coupling element and provided with a journal engaging said draw bar, said lock member having a coupling bar receiving opening extending transversely through the member to permit a coupling bar to project longitudinally of itself through said member, said lock member including an inner arm engageable with the non-circular portion of the coupling bar and an outer arm forked to engage the draw bar whereby oscillating movement of the coupling bar on its journal is prevented when the locking member is in engaged position, said inner and outer arms being laterally spaced from each other to provide therebetween a recess for receiving the hanger link lower end pivoted on said journal.

5. A detachable coupling lock member for a tractor hitch comprising a hanger link, a drawbar and a coupling bar having a journal engaging said draw-bar and having a portion non-circular relative to the axis of the journal and said drawbar having a portion non-circular relative to the axis of the journal, said coupling lock member having a coupling bar receiving opening extending transversely through said member to permit the coupling bar to project longitudinally of itself through said lock member, said lock member having a first means for engaging the non-circular portion of the coupling bar to prevent relative rotation of the lock member and coupling bar, and said lock member having a second means for engaging the non-circular portion of the draw bar to prevent rotation of said lock member relative to the draw bar, said first means being laterally spaced from said second means to provide a recess therebetween for receiving the hanger link lower end pivoted on said journal.

ROBERT H. GREEN.

REFERENCES CITED

The following references are of record in the file of this patent:

UNITED STATES PATENTS

| Number | Name | Date |
|---|---|---|
| 1,374,271 | Alden | Aug. 12, 1921 |
| 1,830,467 | Jones | Nov. 3, 1931 |